(12) United States Patent
Kunde et al.

(10) Patent No.: US 9,262,502 B2
(45) Date of Patent: Feb. 16, 2016

(54) METHODS AND SYSTEMS FOR RECOMMENDING CLOUD-COMPUTING SERVICES TO A CUSTOMER

(71) Applicant: Xerox Corporation, Norwalk, CT (US)

(72) Inventors: Shruti Kunde, Mumbai (IN); Tridib Mukherjee, Bangalore (IN); Gueyoung Jung, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 14/162,886

(22) Filed: Jan. 24, 2014

(65) Prior Publication Data
US 2015/0213106 A1    Jul. 30, 2015

(51) Int. Cl.
  *G06F 9/45* (2006.01)
  *G06F 17/30* (2006.01)
  *G06F 9/455* (2006.01)

(52) U.S. Cl.
  CPC ...... *G06F 17/30589* (2013.01); *G06F 9/45558* (2013.01); *G06F 2009/45595* (2013.01)

(58) Field of Classification Search
  None
  See application file for complete search history.

(56) References Cited

U.S. PATENT DOCUMENTS

2008/0270973 A1* 10/2008 Edwards et al. .............. 717/104
2010/0071035 A1*  3/2010 Budko et al. ...................... 726/4

\* cited by examiner

*Primary Examiner* — Chuck Kendall

(57) ABSTRACT

There is provided systems and methods for creating a repository of templates. The templates are deterministic of a configuration a virtual machine. The method includes creating one or more templates for each of one or more applications types based on a benchmark data. Each of the one or more templates is stored in a hierarchal structure having one or more hierarchal levels. Each of the one or more hierarchal levels is indicative of a parameter of the configuration of the virtual machine. Thereafter, one or more rules are defined to traverse through the one or more hierarchal levels to access the one or more templates.

25 Claims, 8 Drawing Sheets

METHODS AND SYSTEMS FOR RECOMMENDING CLOUD-COMPUTING SERVICES TO A CUSTOMER

TECHNICAL FIELD

The presently disclosed embodiments are related, in general, to a cloud-computing network. More particularly, the presently disclosed embodiments are related to methods and systems for recommending cloud-computing services to a customer.

BACKGROUND

Advancements in the field of virtualization and shared computing have led to the development of cloud-computing infrastructure. The cloud-computing infrastructure may include a data centre that has one or more computational resources. These computational resources may be allocated to a requestor for performing one or more operations. Examples of the computational resources may include, but are not limited to, one or more processor instances, storage space, and RAM memory space. In an embodiment, the computational resources are allocated to the requestor in the form of a virtual machine. In addition to the computational resources, the cloud-computing infrastructure may offer other services to the requestor such as software and operating systems.

A typical cloud-computing infrastructure maintains a pool of pre-configured virtual machines having a pre-defined configuration. When the requestor requests to execute an application, the cloud-computing infrastructure may search for an optimum virtual machine in the pool of virtual machines to get the application executed. As the pool of virtual machines includes a large number of virtual machines, searching for the optimum virtual machine may be a cumbersome and a time consuming job.

SUMMARY

According to embodiments illustrated herein there is provided a method for creating a repository of templates, the templates being deterministic of a configuration of at least one virtual machine. The method includes creating, by one or more processors, one or more templates for each of one or more applications types based on a benchmark data. Each of the one or more templates are stored in a hierarchal structure having one or more hierarchal levels based on the configuration of the at least one virtual machine. Each of the one or more hierarchal levels is indicative of a parameter of the configuration of the at least one virtual machine. The parameter of the configuration of the at least one virtual machine corresponds to at least one of a CPU, a memory, a storage, a load handling capability of the at least one virtual machine, or a software installed on the at least one virtual machine. One or more rules are defined to traverse through the one or more hierarchal levels to access the one or more templates.

According to embodiments illustrated herein there is provided a system for creating a repository of templates. The templates are deterministic of a configuration of at least one virtual machine. The system includes one or more processors operable to create one or more templates for each of one or more applications types based on a benchmark data. The one or more processors are further operable to store each of the one or more templates in a hierarchal structure having one or more hierarchal levels based on the configuration of the at least one virtual machine. Each of the one or more hierarchal levels is indicative of a parameter of the configuration of the at least one virtual machine. The parameter of the configuration of the at least one virtual machine corresponds to at least one of a CPU, a memory, a storage, a load handling capability of the at least one virtual machine, or a software installed on the at least one virtual machine. The one or more processors are further operable to define one or more rules to traverse through the one or more hierarchal levels to access the one or more templates.

According to embodiments illustrated herein there is provided a computer program product for use with a computing device. The computer program product comprising a non-transitory computer readable medium, the non-transitory computer readable medium stores a computer program code for creating a repository of templates. The templates are deterministic of a configuration of at least one virtual machine. The computer program code is executable by one or more processors in the computing device to create one or more templates for each of one or more applications types based on a benchmark data. The computer program code is further executable by one or more processors to store each of the one or more templates in a hierarchal structure having one or more hierarchal levels based on the configuration of the at least one virtual machine. Each of the one or more hierarchal levels is indicative of a parameter of the configuration of the at least one virtual machine. The parameter of the configuration of the at least one virtual machine corresponds to at least one of a CPU, a memory, a storage, a load handling capability of the at least one virtual machine, or a software installed on the at least one virtual machine. One or more rules are defined to traverse through the one or more hierarchal levels to access the one or more templates.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
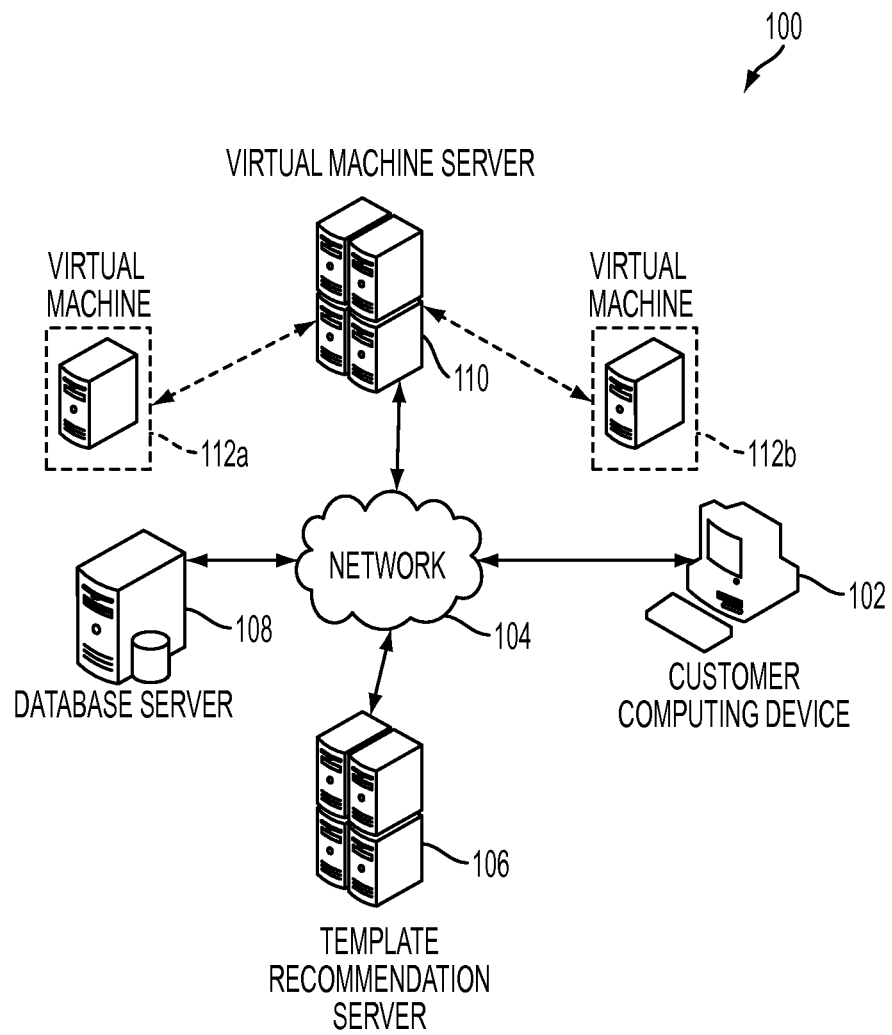
FIG. 1 is a block diagram illustrating a system environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

"Computational resources" refer to resources required for executing an application/workload. In an embodiment, the computational resources correspond to, but are not limited to, processor instances, storage space, RAM space, software applications, security services, and database services, using which the application/workload can be executed.

A "cloud network" corresponds to a universal collection of the computational resources over the internet and forms individual units within the virtualization environment. In an embodiment, one or more computing devices, registered with the cloud network, utilize the computational resources to perform respective operations. In an embodiment, the cloud network may provide one or more services such as, but not limited to, Infrastructure as a service (IaaS), Platform as a service (Paas), Software as a service (SaaS), Storage as a service (STaaS), Security as a service (SECaaS), and Data as a service (DaaS). Some examples of the cloud network may include, but are not limited to, Amazon EC2, Eucalyptus, Windows Azure, etc.

A "virtual machine (VM)" refers to a software that emulates a physical computing environment on a computing device upon which an operating system (OS) or a program can be installed and executed. The virtual machines are installed upon a virtualization layer such as a virtualization platform or a hypervisor that manages the virtual machine and handles the communication between the virtual machine and the underlying physical hardware of the computing device. In an embodiment, multiple virtual machines may be implemented on the virtualization layer. A cloud service provider may recommend the computational resources to customers in the form of the virtual machines (VMs). For example, 1 GB RAM, 2 CPUs, and a disk space of 20 GB may constitute one virtual machine.

A "virtual machine server" refers to a computational device that can host one or more virtual machines. The virtual machine server may include a middleware (known as hypervisor) that controls the allocation of the computational resources associated with the VMs.

A "template" refers to a proposal/recommendation that is presented to a user for acceptance, in response to a request received from the user to execute an application. In an embodiment, the template may include information pertaining to a configuration of a virtual machine that may be a best-suited virtual machine to execute the application. Further, the template may further include information pertaining to the cost of the virtual machine, a type of application for which the virtual machine has been configured, or a time duration for which the virtual machine has been allocated to the user.

An "application" refers to software or a workload that a requestor may want to execute on the cloud network. The customers use the computational resources to execute the application on the cloud network. The applications may vary in their resource requirements; for example, some applications may be memory-intensive (and thus may require large memory space to be executed), while other applications may be CPU-intensive. In an embodiment, an application may be of one or more types such as, but are not limited to, web based applications, gaming applications, analytical applications, and mobile applications.

"Benchmark Data" refers to a performance data pertaining to execution of one or more applications on a virtual machine having a pre-defined configuration. In an embodiment, the benchmark data corresponds to at least one of a number of virtual machines of the pre-defined configuration required to execute an application of a particular application type, a performance measure of the virtual machine with the pre-defined configuration while executing the application of the particular application type, a cost of the virtual machine, a measure of throughput attained by the virtual machine, or a number of nodes required by the virtual machine to execute the application.

A "configuration of a virtual machine" refers to a set of computational resources contained in the virtual machine. For example, if the virtual machine includes 2 cores of CPU, 1 GB RAM, and 500 GB hard disk, then 2 cores of CPU, 1 GB RAM, and 500 GB hard disk, correspond to the configuration of the virtual machine. Further, the configuration of the virtual machine may include one or more software applications installed on the virtual machine. For instance, if the virtual machine has a pre-installed word processing application, such word processing application may also constitute the configuration of the virtual machine.

A "load handling capability of a virtual machine" corresponds to a measure of the amount of computational work that a virtual machine performs. In an embodiment, the load handling capability of the virtual machine may include information pertaining to one or more applications in the process queue of the CPU that are needed to be processed by the virtual machine. In an embodiment, the load handling capability of the virtual machine may be broadly categorized as a light load, moderate load, and heavy load.

A "performance measure of a virtual machine" refers to the amount of work accomplished by the virtual machine based on to the time consumed and the computational resources used by the virtual machine.

"One or more requirements parameters" correspond to one or more constraints that are to be fulfilled in order to process an application. In an embodiment, the one or more requirements parameters may include, but are not limited to, a load requirement of the application, budget constraints of a requestor, a virtual machine type required to execute the application, a performance expected by the requestor, a time duration for which a virtual machine is required, etc.

FIG. 1 is a block diagram illustrating a system environment 100 in which various embodiments can be implemented. The system environment 100 includes a customer-computing device 102, a network 104, a template recommendation server 106, a database server 108, a virtual machine server 110, and one or more virtual machines 112a, 112b (hereinafter referred as the virtual machines 112).

The customer-computing device 102 refers to a computing device used by a customer, who wants to rent/purchase the one or more computational resources from the virtual machine server 110. In an embodiment, the customer may want to rent/purchase the computational resources in order to process/execute an application. In order to rent/purchase the computational resources, the customer may submit one or more requirements parameters to the template recommendation server 106 through the customer-computing device 102. Thereafter, the customer-computing device 102 receives one or more templates as recommendation, from the template recommendation server 106. In an embodiment, the one or more templates correspond to a proposal/recommendation of a virtual machine configuration that may be best suited to execute the application. The customer-computing device 102 may correspond to a variety of computing devices, such as a desktop, a laptop, a personal digital assistant (PDA), a tablet computer, and the like.

The network 104 corresponds to a medium through which content and messages/signals flow between various devices of the system environment 100 (i.e., the customer-computing device 102, the template recommendation server 106, the database server 108, and the virtual machine server 110). Examples of the network 104 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 104 in accordance with various wired and wireless communication protocols such as Transmission Control Protocol and Internet Protocol (TCP/IP), User Datagram Protocol (UDP), and 2G, 3G, or 4G communication protocols.

In an embodiment, the template recommendation server 106 corresponds to a computing device that may maintain a repository of templates. In an embodiment, the template recommendation server 106 stores the repository of templates in the database server 108. In another embodiment, the template recommendation server 106 may create one or more templates for one or more application types based on a benchmark data associated with each of the one or more application types. The creation of the one or more templates based on the benchmark data has been described later in conjunction with FIG. 3. In addition, the template recommendation server 106 receives the one or more requirements parameters from the customer-computing device 102 for processing the application. Thereafter, the template recommendation server 106 searches for a set of templates, from the template repository, that includes at least the configuration of a virtual machine that is best suited for executing the application. The searching for the template has been described later in conjunction with FIG. 5 and FIG. 6. In another embodiment, the template recommendation server 106 creates a new template using the one or more templates in the repository of templates, based on the one or more requirements parameters. The creation of the new template has been described later in conjunction with FIG. 7 and FIG. 8. In an embodiment, the template recommendation server 106 can be realized through an application server that has the capability of creating the new template and searching for the template. Some example of known application servers may include, but are not limited to, Java server, .NET framework, and Base4 server.

The database server 108 maintains the repository of templates and the benchmark data pertaining to the one or more application types. In an embodiment, the database server 108 stores the repository of templates in form of a hierarchal structure having one or more hierarchal levels. In an embodiment, each of the one or more hierarchal levels corresponds to a parameter of the configuration of a virtual machine. The hierarchal structure for storing the one or more templates is described later in conjunction with FIG. 4. The database server 108 may receive one or more queries from the template recommendation server 106 to search the one or more templates. In an embodiment, the database server 108 may be implemented using one or more known technologies such as, but not limited to, Microsoft® SQL server, Oracle, and My SQL.

The virtual machine server 110 refers to a computing device or a collection of computing devices (e.g., data-centre) that has a pool of computational resources. In an embodiment, the virtual machine server 110 may rent out one or more computational resources from the pool of computational resources to the customer by hosting the virtual machines 112. In an embodiment, the virtual machine server 110 may create a new virtual machine based on the template selected by the customer. In an embodiment, the virtual machine server 110 obtains the information pertaining to the selected template from the template recommendation server 106. Further, in an embodiment, the virtual machine server 110 includes a hypervisor that manages the virtual machines being hosted by the virtual machine server 110. In an embodiment, the hypervisor maps the computational resources associated with the virtual machines 112 to the hardware resources of the virtual machine server 110. In an embodiment, the virtual machines 112 may connect to the network 104 through the virtual machine server 110 using at least one of a Network Address Translation (NAT) protocol, or bridging protocol. Examples of the hypervisor may include, but are not limited to, VMware®, KVM®, Xen®, etc.

A person having ordinary skill in the art would understand that the scope of the disclosure is not limited to having database server 108, the template recommendation server 106, and the virtual machine server 110 as separate entities. In an embodiment, the functionalities of the template recommendation server 106 and the database server 108 can be implemented on the virtual machine server 110.

Figure 2:
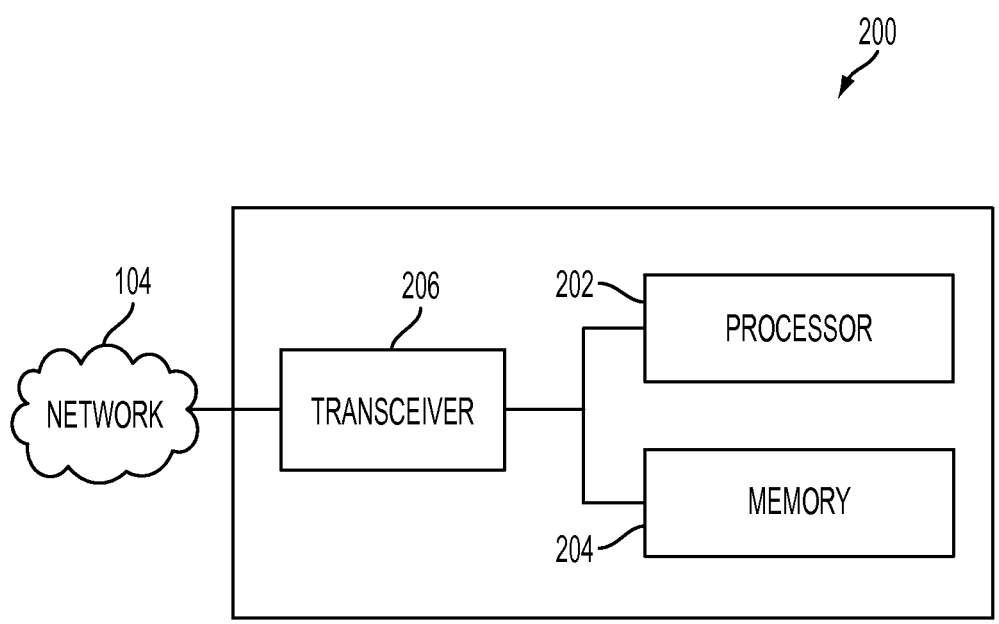
FIG. 2 is a block diagram of a system, in accordance with at least one embodiment.

FIG. 2 is a block diagram of a system 200, in accordance with at least one embodiment. The system 200 includes a processor 202, a transceiver 206, and a memory 204. The processor 202 is coupled to the transceiver 206 and the memory 204. The transceiver 206 is connected to the network 104. For the purpose of ongoing description, the system 200 has been considered as the template recommendation server 106. However, a person having ordinary skill in the art would understand that the scope of the disclosure is not limited to the system 200 as the template recommendation server 106. In an embodiment, the system 200 may correspond to the customer-computing device 102 or the virtual machine server 110. In a scenario, where the system 200 corresponds to the customer-computing device, the system 200 may further include an input device 208 coupled to the processor 202.

The processor 202 includes a suitable logic, a circuitry, and/or interfaces operable to execute one or more instructions stored in the memory 204 to perform predetermined operation on the template recommendation server 106. The memory 204 may be operable to store the one or more instructions. The processor 202 may be implemented using one or more processor technologies known in the art. Examples of the processor 202 may include, but not limited to, an X86 processor, a RISC processor, an ASIC processor, a CISC processor, or any other processor.

The memory 204 stores a set of instructions and data. Some of the commonly known memory implementations may include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enable the hardware of the template recommendation server 106 to perform the predetermined operation.

The transceiver 206 transmits and receives messages and data to/from various components of the system environment 100 (i.e., the customer-computing device 102, the virtual machine server 110, the database server 108 etc.). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols. Operation of the template recommendation server 106 has been described in conjunction with FIG. 3, FIG. 5, and FIG. 7.

In an embodiment, the input device 208 receives a user input from the customer. In an embodiment, the user input may correspond to the request for executing the application. In an embodiment, the request may include the one or more requirements parameters. Examples of the input device 208 include, but are not limited to, a mouse, a keyboard, a touch panel, a track-pad, a touch screen, or any other device that has the capability of receiving the user input.

Figure 3:
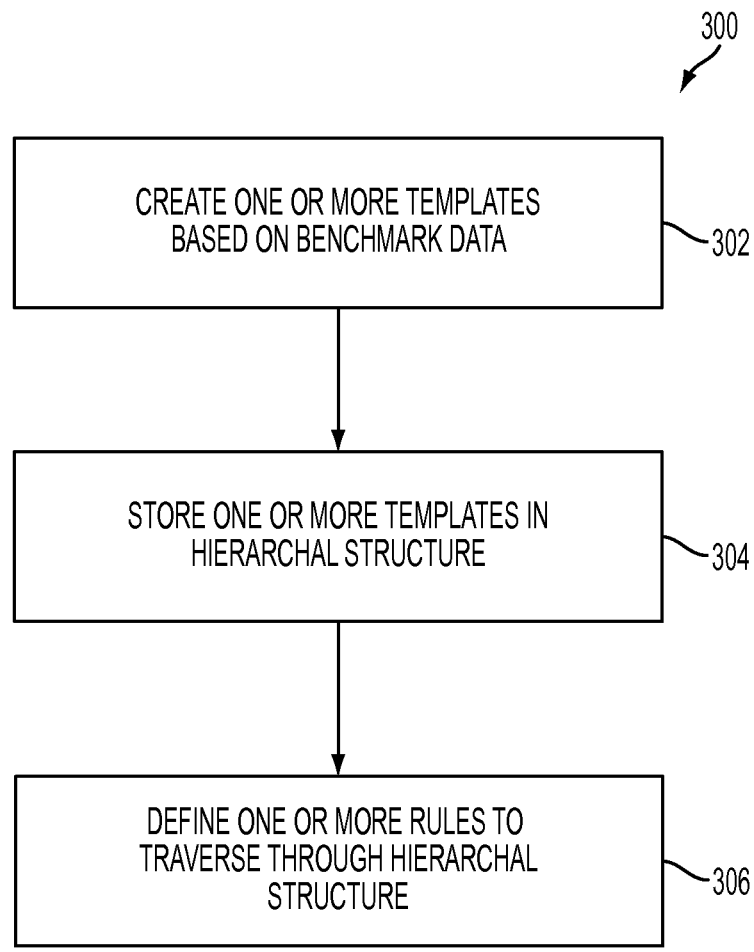
FIG. 3 is a flowchart illustrating a method for creating a repository of templates, in accordance with at least one embodiment.

FIG. 3 is a flowchart 300 illustrating a method for creating a repository of templates, in accordance with at least one embodiment. The flowchart 300 is described in conjunction with FIG. 1 and FIG. 2.

At step 302, one or more templates are created based on the benchmark data. In an embodiment, the processor 202 is configured to create the one or more templates. Prior to creating the one or more templates, the processor 202 is configured to extract the benchmark data from the database server 108. The benchmark data includes data pertaining to a measure of the performance of an application of the particular application type on one or more virtual machines. The following table illustrates an example benchmark data:

TABLE 1

| An example benchmark data | | | | | | |
|---|---|---|---|---|---|---|
| Application type | Load type | Virtual Machine type | Virtual Machine configuration | Number of instances | Number of nodes | Throughput |
| Web-tier | Light | Small | CPU: 80 MHz Memory: 1 GB Storage: 5 GB | 2 | 1 | 3.5 |
| | | Medium | CPU: 1 GHz Memory: 3 GB Storage: 50 GB | 1 | 1 | 2.5 |
| | | Large | CPU: 3 GHz Memory: 10 GB Storage: 1 TB | NA | NA | NA |
| | Moderate | Small | CPU: 80 MHz Memory: 1 GB Storage: 5 GB | 6 | 2 | 3.1 |
| | | Medium | CPU: 1 GHz Memory: 3 GB Storage: 50 GB | 4 | 1 | 3.5 |
| | | Large | CPU: 3 GHz Memory: 10 GB Storage: 1 TB | NA | NA | NA |
| Web-tier | Heavy | Small | CPU: 80 MHz Memory: 1 GB Storage: 5 GB | NA | NA | NA |
| | | Medium | CPU: 1 GHz Memory: 3 GB Storage: 50 GB | 8 | 4 | 4 |
| | | Large | CPU: 3 GHz Memory: 10 GB Storage: 1 TB | 2 | 1 | 5 |

Table 1 illustrates the example benchmark data for a web-tier application. From the table, it can be observed that the web-tier application of a heavy load may require two instances of a large sized virtual machine to process the application. The same workload can be handled by eight instances of medium sized virtual machine.

In an embodiment, an application of each type is processed on each type of virtual machine. The throughput of each type of virtual machine, on processing the application of each type, is observed and recorded as the benchmark data. In addition, for each application type, the application of different load is executed on the virtual machine of each type. The throughput observed, in such a scenario, is also recorded as the benchmark data. Further, relationship between the number of instances of the virtual machine and the observed throughput is also included in the benchmark data. Further, a person having ordinary skill in the art would understand that the benchmark data can be obtained using one or more known benchmarking techniques such as, but not limited to, Combo Benchmark® and GOBENCH®.

The processor 202 creates the one or more templates for each application type based on the benchmark data. For example, based on the benchmark data illustrated in Table 1, the processor 202 may create the following templates for the application type of web-tier:

TABLE 2

Example templates

| TEMPLATES | VIRTUAL MACHINE CONFIGURATION |
|---|---|
| Template-1 | Load: Light<br>Application Type: Web-tier<br>Virtual machine type: Small<br>CPU: 80 MHz<br>Memory: 1 GB<br>Storage: 5 GB<br>Number of instances: 2<br>Number of nodes: 1<br>Cost: 20 USD/hour |
| Template-2 | Load: Light<br>Application Type: Web-tier<br>Virtual machine type: Medium<br>CPU: 1 GHz<br>Memory: 3 GB<br>Storage: 50 GB<br>Number of instances: 1<br>Number of nodes: 1<br>Cost: 15 USD/hour |
| Template-3 | Load: Moderate<br>Application Type: Web-tier<br>Virtual machine type: Small<br>CPU: 80 MHz<br>Memory: 1 GB<br>Storage: 5 GB<br>Number of instances: 6<br>Number of nodes: 2<br>Cost: 60 USD/ hour |

In an embodiment, each of the application type, the virtual machine type, the CPU, the memory, the storage, the number of instances, the number of nodes, and the cost illustrated in the one or more templates corresponds to a parameter of the configuration of the virtual machines. A person having ordinary skill in the art would understand that the scope of the disclosure is not limited to the above-mentioned parameters of the virtual machine configuration.

At step 304, the one or more templates are stored in a hierarchal structure. In an embodiment, the processor 202 is configured to store the one or more templates in the hierarchal structure in the database server 108. In an embodiment, the hierarchal structure includes one or more hierarchal levels where each hierarchal level corresponds to a parameter of the configuration of a virtual machine illustrated in a template. For example, a first level of the hierarchal structure may correspond to the application type. The processor 202 categorizes the one or more templates in one or more first categories based on the application type mentioned in each of the one or more templates. For example, the one or more templates include five templates out of which three templates include configuration of the virtual machine best suited to execute web-tier application (the application type parameter is also illustrated in the three templates). The remaining two templates include configuration of the virtual machine best suited to execute gaming applications. The processor 202 may categorize the three templates corresponding to the web-tier application in a first category (i.e., category for web-tier application) and the remaining two templates in a second category (i.e., category for gaming applications).

Similarly, the hierarchal structure may include a second hierarchal level corresponding to the CPU power under the first hierarchal level (i.e., the application type). For example, all the templates in the one or more first categories, at the first hierarchal level corresponding to the application type parameter, are further categorized in one or more second categories based on the CPU power illustrated in the respective templates. Referring to the example described above, the first category includes three templates. These three templates are categorized in the one or more second categories based on the CPU power mentioned in the respective three templates.

On similar terms, the one or more templates are further categorized as per the one or more hierarchal levels in the hierarchal structure. Thereafter, the processor 202 stores the one or more templates, structured as per the hierarchal structure, in the database server 108. An example hierarchal structure has been described later in conjunction with FIG. 4.

At step 306, one or more rules are defined to traverse the hierarchal structure. In an embodiment, the processor 202 defines the one or more rules based on the benchmark data and the hierarchal structure. Referring to table 1, when the application type is web-tier and the load is light, either the medium sized virtual machine or the small sized virtual machine is required to process such applications. Thus, the processor 202 may formulate the following rule:

if {application type=web-tier} and {load
    type=light}→{virtual machine type=small or
    virtual machine type=medium}    (1)

Further, the processor 202 determines such patterns in the benchmark data to define the one or more rules. Further, the one or more rules are so defined that the outcome of a rule applied at a hierarchal level leads to the next hierarchal level in the hierarchal structure. For example, as discussed above, the application type corresponds to the first hierarchal level and the virtual machine type corresponds to the second hierarchal level under the first hierarchal level. The rule is so defined that when the rule is applied to the hierarchal level corresponding to the application type, the outcome of the rule leads to the next hierarchal level in the hierarchal structure (i.e., virtual machine type).

As discussed above, the benchmark data includes the information pertaining to the performance of each type of virtual machine on each type of application with each type of load. Thus, in an embodiment, the processor 202 may be configured to map the one or more requirements parameters with the configuration of the virtual machines, based on the benchmark data. For example, the throughput measure in the benchmark data is mapped to the number of instances required by the virtual machine to achieve the throughput. For example, to achieve the throughput between 2.5 and 3.5, either two instances of the small sized virtual machine are required or a single instance of a medium sized virtual machine is required. Similarly, the performance measure can be mapped to the configuration of the virtual machine. The following table illustrates an example mapping of the one or more requirements parameters with the parameters of the configuration of the virtual machine:

TABLE 3

An example mapping of one or more requirements parameters
with one or more configuration parameters

| Requirements parameters | Range | Virtual machine type | Virtual machine Configuration |
|---|---|---|---|
| Load | Light | Small sized Virtual machine or medium sized virtual machine | |
| | Medium | Medium sized virtual machine | |
| | Heavy | Medium sized virtual machine or large sized virtual machine | |
| Performance | 0-10 min/ service | Large sized virtual machine | CPU power: 3 Ghz RAM: 3 GB Storage: 1 TB Instances: 1 |
| | | Medium sized virtual machine | CPU power: 1.5 Ghz RAM: 1.5 GB Storage: 500 GB Instances: 2 |
| | 10-20 min/ service | Medium sized Virtual Machine | CPU power: 1 Ghz RAM: 1 GB Storage: 100 GB Instances: 1 |
| | 20-30 min/ service | Small sized virtual machine | CPU power: 100 Mhz RAM: 256 MB Storage: 10 GB Instance: 1 |
| | | Small sized virtual machine | CPU power: 80 Mhz RAM: 128 MB Storage: 5 GB Instance: 2 |

Referring to Table 3, if the load of an application that a customer wishes to execute is light, either a small sized virtual machine or a medium sized virtual machine may be best suited to execute the application. Similarly, if the expected performance required to execute an application is between 20-30 min/service request, then a small sized virtual machine can be used for handling such request. Further, the small sized virtual machine may include CPU of 100 MHz, RAM of 256 MB, and storage of 10 GB. In an embodiment, the processor 202 may utilize at least one of fuzzy logic, neural networks, or one or more statistical techniques to map the one or more requirements parameters with the parameters of the configuration of the virtual machine.

Thereafter, based on the benchmark data, the mapping and the hierarchal structure, the processor 202 defines the one or more rules to traverse the hierarchal structure. In an embodiment, the processor 202 may formulate one or more following if-else rules based on the benchmark data to traverse through the hierarchal structure:

if {application type=web-tier} and {load
type=heavy}→{virtual machine type=moderate
or virtual machine type=Large}  (2)

if {virtual machine type=small} and {performance=0-
10 min/service}→No template available  (3)

if {virtual machine type=large} and {performance=0-
10 min/service}→{Virtual machine
configuration=CPU power: 3 Ghz,RAM: 3
GB,Storage: 1 TB}  (4)

For example, no virtual machine configuration is available for the virtual machine type "small" that gives a performance of "0-10 min/service". Hence, the outcome of rule 3 is NULL.

A person having ordinary skills in the art would understand that the rules 1, 2, 3, and 4 have been mentioned for illustrative purposes. In an embodiment, the processor 202 may generate similar rules based on the benchmark data and the mapping. The traversing through the one or more hierarchal levels based on the one or more rules has been described later in conjunction with FIG. 5 and FIG. 6.

Figure 4:
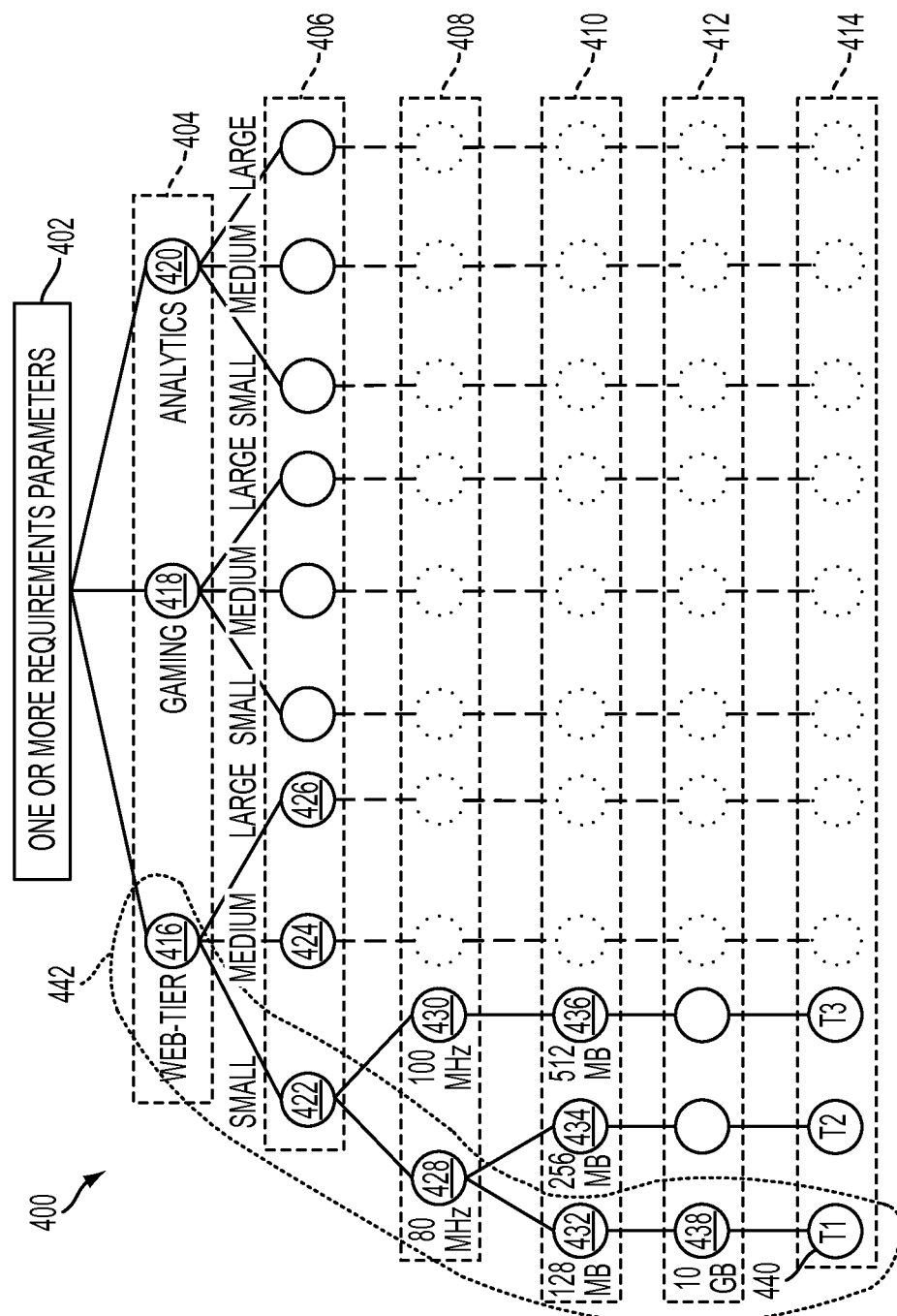
FIG. 4 illustrates an example hierarchal structure, in accordance with at least one embodiment.

FIG. 4 illustrates an example hierarchal structure 400, in accordance with at least one embodiment. The hierarchal structure 400 includes a first hierarchal level 404, a second hierarchal level 406, a third hierarchal level 408, a fourth hierarchal level 410, a fifth hierarchal level 412, and a sixth hierarchal level 414.

As described in conjunction with FIG. 3, each parameter of the configuration of the virtual machine, illustrated in a template is stored in a hierarchal level of the hierarchal structure 400. The first hierarchal level 404 corresponds to the application type illustrated in each of the one or more templates. For example, a "web-tier" application type 416, "gaming" application type 418, and "analytical" application type 420 are application types. The second hierarchal level 406 is one level lower in hierarchy to the first hierarchal level 404. In an embodiment, the second hierarchal level 406 corresponds to the virtual machine type. Each application type mentioned in the first hierarchal level 404 can be processed by types of virtual machine, i.e., a small sized virtual machine (depicted by 422), a medium sized virtual machine (depicted by 424), and a large sized virtual machine (depicted by 426).

The third hierarchal level 408 corresponds to the CPU power in a virtual machine of a type determined at the second hierarchal level 406. For example, the small sized virtual machine 422 has two options for the CPU power, one having the CPU power of 80 Mhz (depicted by 428) and the second having the CPU power of 100 MHz (depicted by 430). Similarly, the fourth hierarchal level 410 corresponds to the RAM present in the virtual machine whose CPU power is determined at the third hierarchal level 408. For example, the virtual machine having CPU power 80 MHz (depicted by 428) has two options for RAM storage, one having the 128 MB RAM (depicted by 432) and the second having 256 MB RAM (depicted by 434). Similarly, the virtual machine having CPU power of 100 MHz (depicted by 430) has only one option of RAM, i.e., 512 MB RAM (depicted by 436).

Similarly, the fifth hierarchal level 412 corresponds to the storage present in the virtual machine. For instance, the virtual machine having the 128 MB RAM (depicted by 432) has storage of 10 GB (depicted by 438). Finally, the sixth hierarchal level 414 corresponds to the one or more templates. Each template includes configuration of the virtual machine that can be determined by traversing back the path from the template to the root node. For example, the template $T_1$ (depicted by 440) will include the configuration of 10 GB Storage, 128 MB RAM, 80 Mhz processor, small sized virtual machine, and web-tier application (determined by traversing back from template $T_1$ (depicted by 440) to the root node through nodes 438, 432, 428, 422, and 416). In an embodiment, the one or more templates are stored at the leaf nodes of the hierarchal structure 400.

A person having ordinary skills in the art would understand that the scope of the disclosure is not limited to the hierarchal structure 400 having six hierarchal levels. In an embodiment, the hierarchal structure 400 may further include additional hierarchal levels corresponding to other parameters of the configuration such as cost of the virtual machine, number of instances of the virtual machine, number of nodes required for the virtual machine, etc.

Figure 5:
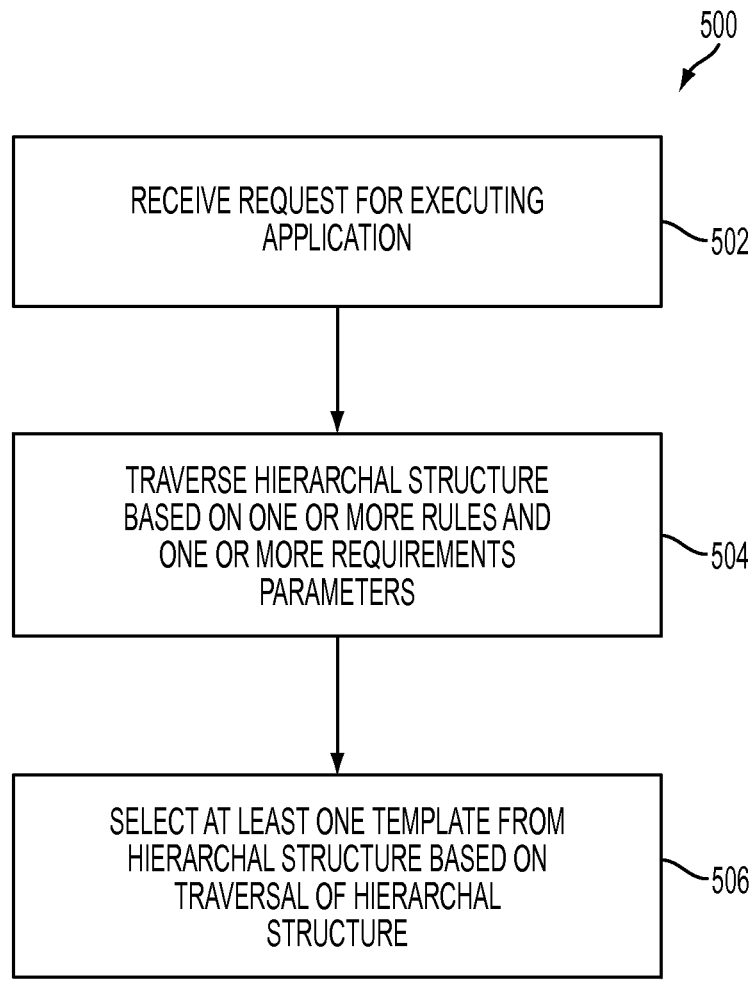
FIG. 5 is a flowchart illustrating a method to search for a template in the hierarchal structure, in accordance with at least one embodiment.

FIG. 5 is a flowchart 500 illustrating a method to search for a template in the hierarchal structure, in accordance with at least one embodiment. The flowchart 500 is described in conjunction with FIG. 1, FIG. 2, FIG. 3, and FIG. 4.

At step 502, a request for executing the application is received from the customer. In an embodiment, the processor 202 is configured to receive the request from the customer through the transceiver 206. In an embodiment, prior to receiving the request, a user interface is presented to the customer through the customer-computing device 102. The user interface enables the customer to input the one or more requirements parameters of the customer to execute the application. The inputted requirements parameters are transmitted to the template recommendation server 106 as the request.

At step 504, the hierarchal structure is traversed using the one or more rules and the one or more requirements parameters. In an embodiment, the processor 202 traverses the hierarchal structure. The traversing through the hierarchal structure has been described later in conjunction with FIG. 6.

At step 506, the set of templates is selected from the hierarchal structure based on the traversing. In an embodiment, the processor 202 selects the set of templates. Selection of the at least one template based on the traversing has also been described in conjunction with FIG. 6.

Figure 6:
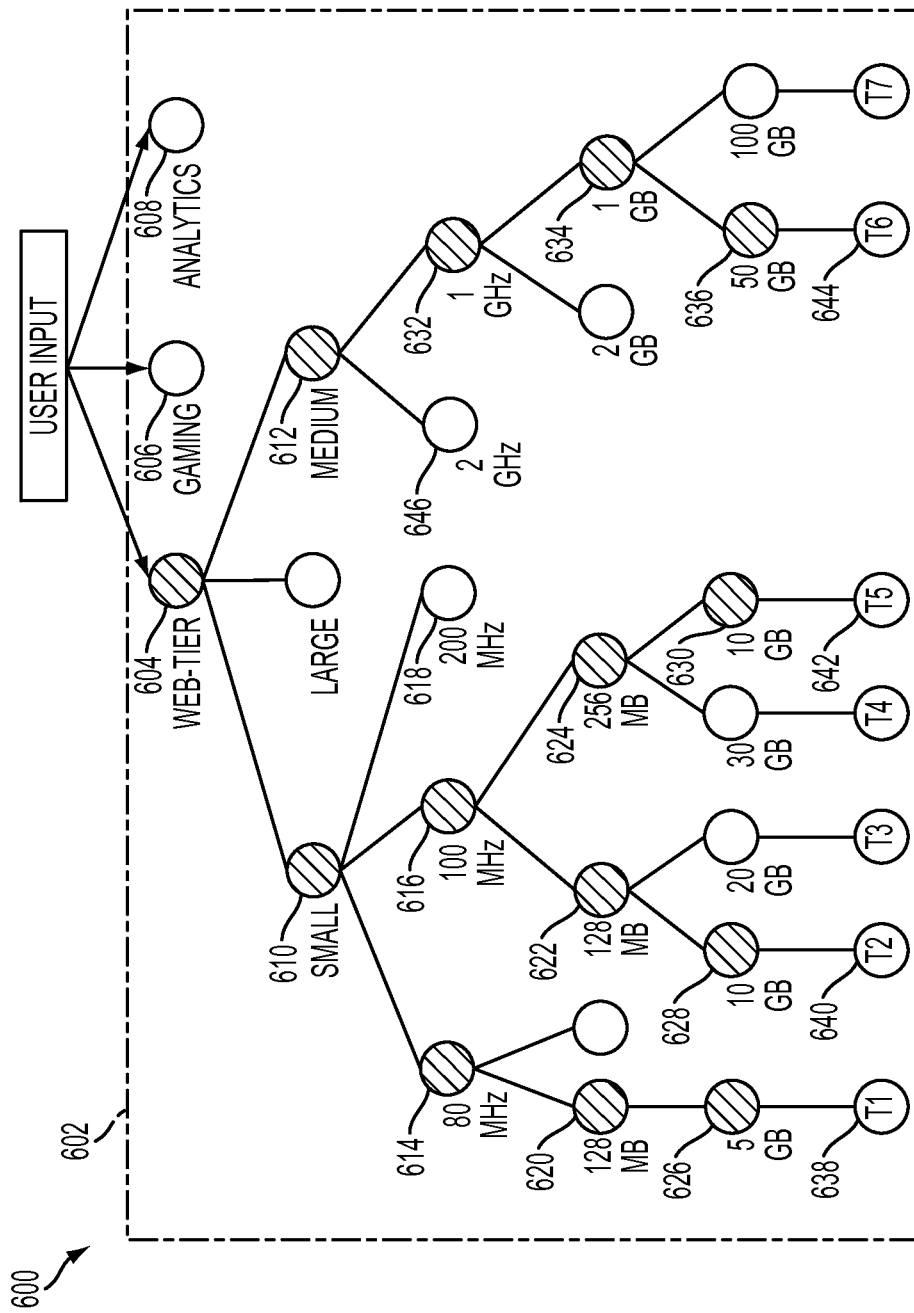
FIG. 6 illustrates an example traversing of a hierarchal structure, in accordance with at least one embodiment.

FIG. 6 is a flow diagram 600 illustrating an example traversing of a hierarchal structure 602, in accordance with at least one embodiment.

For the purpose of the example flow diagram 600, the one or more requirements parameters include:
Application type: Web-tier
Load: Light
Performance: 10-20 min/service request
Time: 12 hours/day
Cost: 20 USD/day Further, for the purpose of the example, the one or more templates have been stored in the hierarchal structure 602.

On receiving the one or more requirements parameters, the processor 202 utilizes the one or more rules (generated at step 306) to traverse the hierarchal structure 602. As the application type mentioned in the one or more requirements parameters is "Web-tier", the processor 202 tags the node 604 in the hierarchal structure 602 corresponding to the application type "Web-tier". Thereafter, the processor 202 utilizes rule 1 (refer FIG. 3) to determine that either a small sized virtual machine or a medium sized virtual machine, is required to process the request of the customer. Thus, the processor 202 tags the nodes 610 and 612 corresponding to the small sized virtual machine and the medium sized virtual machine, respectively.

Post determining the virtual machine type, the processor 202 determines the configuration of the virtual machine (either a small sized or a medium sized, virtual machine). In an embodiment, the processor 202 may utilize following rules to determine the configuration of the virtual machine:

if {virtual machine type=small} and {performance=10-20 min/service}→{Virtual machine configuration=CPU power: 100 Mhz,RAM: 256 MB,Storage: 10 GB} or {Virtual machine configuration=CPU power: 100 Mhz,RAM: 128 MB,Storage: 10 GB} or {Virtual machine configuration=CPU power: 80 Mhz,RAM: 128 MB,Storage: 5 GB}   (5)

if {virtual machine type=medium} and {performance=10-20 min/service}→{Virtual machine configuration=CPU power: 1 Ghz,RAM: 1 GB,Storage: 50 GB}   (6)

A person having ordinary skills in the art would understand that rules 5 and 6 are obtained based on the mapping of the one or more requirements parameters with the one or more configuration parameters (discussed above in conjunction with step 306). In an embodiment, the mapping is determined based on the benchmark data.

Based on the rule 5, the processor 202 tags the nodes 614 and 616 corresponding to the CPU power 80 MHz and 100 MHz, respectively. Further, under the node 614, the processor 202 tags the node 620 corresponding to the 128 MB RAM. Similarly, under the node 616 (corresponding to CPU power of 100 MHz), the processor 202 tags the nodes 622 and 624 corresponding to 128 MB RAM and 256 MB RAM, respectively. Similarly, the processor 202 tags the node 626 (corresponding to the storage of 5 GB) under the node 620 (corresponding to the RAM space of 128 MB) for the 80 MHz CPU power. In addition, the processor 202 tags the nodes 628 (corresponding to the 10 GB storage) and 630 (corresponding to the 10 GB storage) under the nodes 622 and 624, respectively, for the 100 MHz CPU power.

Similarly, based on the rule 6, the processor 202 tags the nodes 632 (corresponding to 1 GHz CPU power), 634 (corresponding to 1 GB RAM), and 636 (corresponding to 50 GB storage) under for the medium sized virtual machine (depicted by the node 612). Accordingly, the processor 202 selects the templates $T_1$ (depicted by 638), $T_2$ (depicted by 640), $T_5$ (depicted by 642), and $T_6$ (depicted by 644) from the one or more templates.

Post selecting the templates, the processor 202 determines the number of instances of the virtual machine (listed in each of the selected templates) required to process the application. In an embodiment, the processor 202 determines the number of instances based on the benchmark data. For example, the processor 202 determines that three instances of the small sized virtual machine (having configuration of 100 MHz processor, 128 MB RAM, and 10 GB storage) is required for achieving the required throughput as inputted by the customer in the one or more requirements parameters. Further, the processor 202 determines that one instance of the medium sized virtual machine is required to achieve the required throughput.

In an alternate embodiment, the processor 202 determines the best configuration of the virtual machine that gives the maximum throughput while executing the application. Thereafter, based on the configuration of the best-identified virtual machine, the processor 202 determines the number of instances required for each configuration of the virtual machine in each of the selected template.

For example, the processor 202 determines that two instances of a virtual machine having configuration of 200 MHz processor, 512 RAM, and 20 GB hard disk helps in achieving maximum throughput. Thus, the processor 202 determines that four instances of the virtual machine with configuration CPU power: 100 MHz, RAM: 256 MB Storage: 10 GB will be able to achieve same throughput (included in template $T_5$). Similarly, the processor 202 determines the number of instances for the configuration of the virtual machine in each of selected template.

Post determining the number of instances for each virtual machine listed in each of selected templates, the processor 202 determines the overall cost to the customer for each template. For example, cost of a single virtual machine listed in the template $T_5$ is 2 USD/day. The cost of using four such instances of the virtual machine (listed in template $T_5$) is 8 USD/day, which is less than the cost constraint, inputted by the customer in the one or more requirements parameters (i.e., 20 USD/day). Thus, the processor 202 will select the template $T_5$ for presentation to the customer.

Similarly, the processor 202 selects such templates (where the cost of the virtual machine is less than the cost constraint of the customer) from the selected set of templates. These templates will be presented to the customer individually on the customer-computing device 102.

In an embodiment, the customer may not select any of the templates presented by the template recommendation server 106. In such a scenario, the customer may modify the presented template as per his/her requirements. For example, the customer may modify the template $T_5$ from CPU power: 100 MHz, RAM: 256 MB, Storage: 10 GB to CPU power: 200 Mhz, RAM: 720 MB, Storage: 10 GB. The processor 202 may store such modified templates in the hierarchal structure 602. Further, the processor 202 may generate a set of rules for accessing the modified templates. In an embodiment, the set of rules are added to the one or more rules. In another embodiment, the processor 202 is unable to determine any suitable configuration of the virtual machine from the hierarchal structure 602.

In another embodiment, the customer may choose to create a completely new virtual machine from scratch. In such a scenario, a template is generated for the newly created virtual machine. The template for the newly created virtual machine is stored on the hierarchal structure 602 based on the one or more requirements parameters inputted by the user. In an embodiment, the one or more requirements parameters act as basis for the generation of the set of rules by the processor 202 to access the template for the newly created virtual machine. For example, while requesting to execute the application, the customer may input the application type as gaming, the minimum performance requirement as 5 min/service, and the load requirement as medium. Further, the newly created virtual machine by the customer corresponds to a medium sized virtual machine. Thus, the processor 202 may generate a rule as follows:

if {application type=Gaming} and
    {load=medium}→{Virtual machine
    type=medium sized virtual machine}     (7)

if {virtual machine type=medium} and {performance=0-5 min/service}→{Virtual machine configuration=(configuration of the newly created virtual machine)}     (8)

In another alternate embodiment, the processor 202 may create a new template using one or more existing templates. The creation of the new template has been described in conjunction with FIG. 7.

Figure 7:
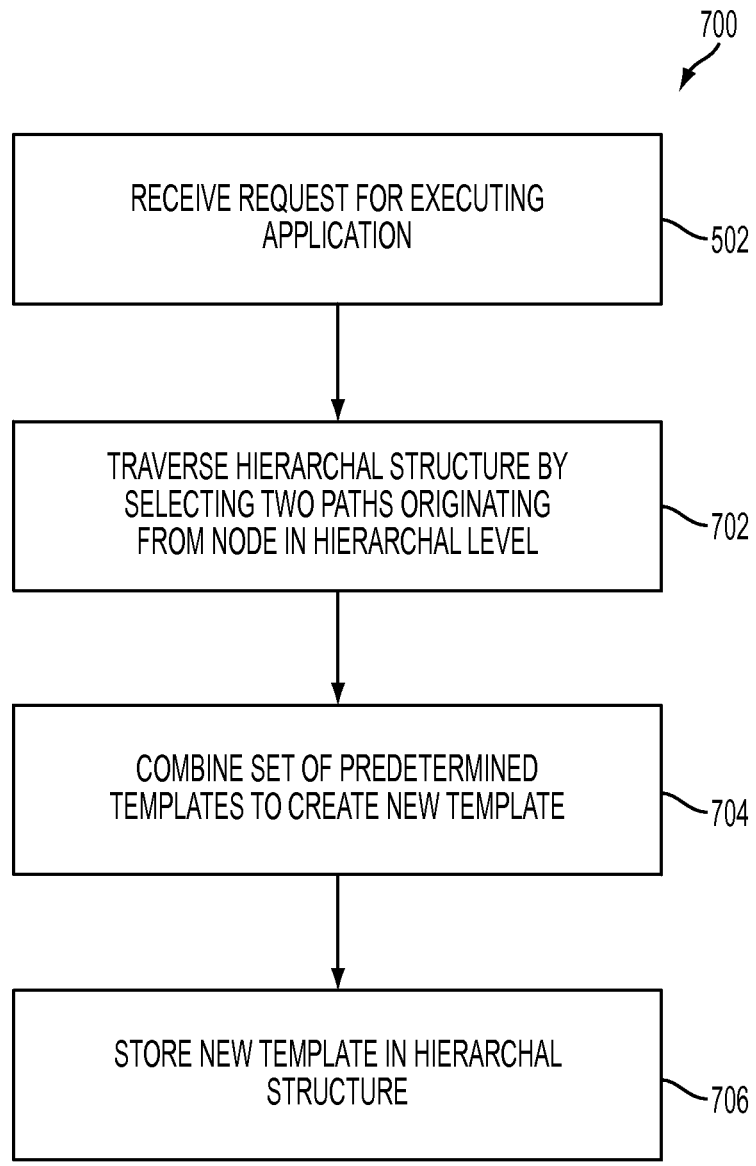
FIG. 7 is a flowchart illustrating a method for creating a template from the one or more existing templates, in accordance with at least one embodiment.

FIG. 7 is a flowchart 700 illustrating a method for creating a template from the one or more existing templates, in accordance with at least one embodiment. The flowchart 700 is described in conjunction with FIG. 8.

Figure 8:
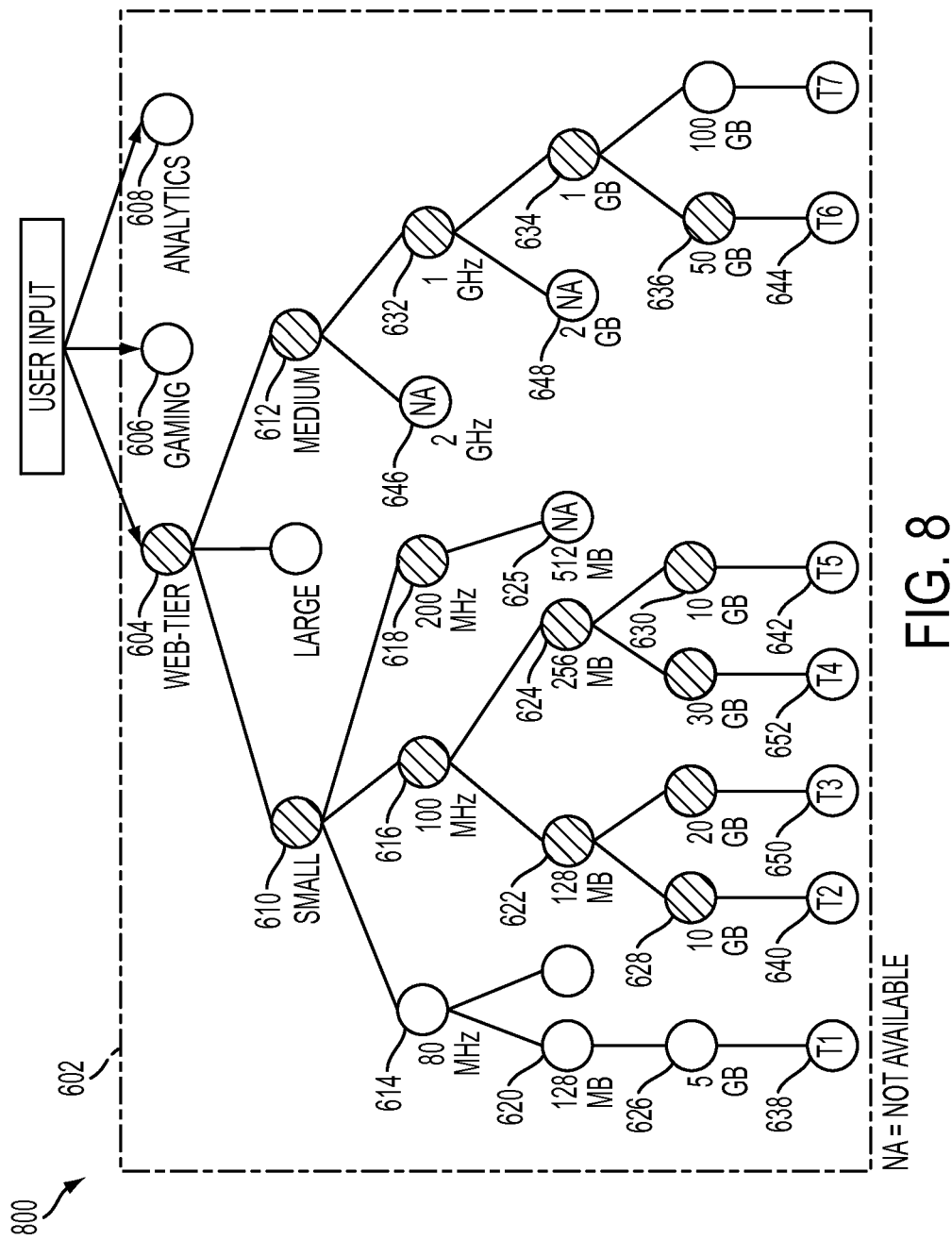
FIG. 8 illustrates another example traversing of the hierarchal structure, in accordance with at least one embodiment.

FIG. 8 is a flow diagram illustrating traversing of the hierarchal structure 602, in accordance with at least one embodiment.

Referring to FIG. 7, at step 502, the request to execute the application is received from the customer. As described above the request includes the one or more requirements parameters such as the load requirement of the application, budget constraints of the requestor to execute the application, the virtual machine type required to execute the application, the expected performance required by the customer, the time duration for which a virtual machine is required.

If the processor 202 determines by executing the steps 504, and 506, that no suitable configuration of the virtual machine is available to meet the one or more requirements parameters, step 702 is performed.

At step 702, the hierarchal structure 602 is traversed by selecting two nodes lower in hierarchy to a node, based on the one or more requirements parameters and the one or more rules. As described in conjunction with FIG. 6, the processor 202 tags the node 604 corresponding to the application type web-tier. Thereafter, the processor 202 determines that either the small sized virtual machine or the medium sized virtual machine will be best suited for executing the application. Thus, in the hierarchal structure 602, the processor 202 tags the nodes 610 and 612.

As no suitable configuration of the virtual machines under the nodes 610 and 612 will meet the requirements of the customer, the processor 202 may select at least two paths originating from the current node. The at least two paths may correspond to two configurations of the virtual machines that may be available for executing the application.

For example, the processor 202 determines that either the medium sized virtual machine or the small sized virtual machine is best suited for the customer to execute the application. In addition, the processor 202 determines that a virtual machine having a configuration of 1 GHz processor, 4 GB RAM, and 500 GB hard disk is best suited for the customer. Neither the small sized virtual machine nor the medium sized virtual machine has such configuration. In such a scenario, the processor 202 may select two best available options at each node in the hierarchal structure 602. For example, from the node 610 (corresponding to the small sized virtual machine), the processor 202 may select the node 616 (corresponding to the 100 MHz CPU power) and the node 618 (corresponding to the 200 MHZ CPU power). Similarly, from the node 612 (corresponding to the medium sized virtual machine), the processor 202 may select the node 646 (corresponding to 2 GHz CPU power) and the node 632 (corresponding to 1 GHz CPU power).

Similarly, from each of the nodes 616, 618, 646, and 632, the processor 202 may select two best available options originating from each of the nodes 616, 618, 648, and 632. For example, from the node 616, the processor 202 selects the nodes 622 (corresponding to the RAM of 128 MB) and 624 (corresponding to the RAM of 256 MB) as these are the only two nodes originating from the node 616. In an embodiment, if the processor 202 determines that out any two paths originating from a node, one path is not available, the processor 202 leaves the one path and selects the second path. The unavailability of the path is determined by the virtual machine server 110. For instance, if the virtual machine server 110 determines that only 1 GB memory is available with the virtual machine server 110 for hosting a virtual machine, the path leading to 2 GB RAM is marked as unavailable. The virtual machine server 110 may send an update notification to the database server 108 periodically to update the hierarchal structure 602. For example, in the hierarchal structure 602, nodes 625, 646, and 648 are not available.

The processor 202 continues the process of selecting two best possible options available at each node in the hierarchal structure 602 until the processor 202 reaches the leaf nodes. At the leaf nodes, the processor 202 selects a set of predetermined templates. For instance, the processor 202 selects the templates $T_2$ (depicted by 640), $T_3$ (depicted by 650), $T_4$ (depicted by 652), $T_5$ (depicted by 642), and $T_6$ (depicted by 644).

At step 704, the processor 202 combines the set of predetermined templates to create a new template $T_{new}$. The new template $T_{new}$ may include a virtual machine configuration that may be created by combining the computational resources present in the virtual machines listed in each template in the set of predetermined templates. In another embodiment, the new template $T_{new}$ may include configuration of individual virtual machines (listed in the set of predetermined templates). In an embodiment, the combination of the virtual machines in the new template $T_{new}$ is used for processing the application. A person having ordinary skill would understand that each virtual machine in the new template $T_{new}$ is having a different configuration.

At step 706, the new template $T_{new}$ is stored in the hierarchal structure 602 in the database server 108. In an embodiment, the processor 202 stores the new template $T_{new}$ in the hierarchal structure 602. Further, the processor 202 defines the set of rules to traverse through the hierarchal structure 602 in order to access the new template $T_{new}$.

The disclosed embodiments encompass numerous advantages. The one or more templates are stored in a hierarchal structure. The hierarchal structure is traversed using one or more rules. In order to search for a template, the customer may provide requirements parameters. These requirements parameters are mapped to system level requirements or the configuration parameters of a virtual machine. Thereafter, based on the configuration parameters of the virtual machine and the one or more rules, the hierarchal structure is traversed in order to search for a relevant template. As the one or more templates are stored in the hierarchal structure rather than directly in the database server 108, searching of the one or more templates is easy and less complex. In case the hierarchal structure does not include the required template or configuration of the virtual machine, the hierarchal structure is so searched that at each hierarchal level at least two paths are selected. The traversal of the hierarchal structure continues until leaf nodes are reached. From the leaf nodes, a predefined set of templates is selected. These predefined set of templates are combined to create a new template. This new template is presented to the customer. As the new template is generated based on the existing templates, the system can recommend heterogeneous configurations to the customer.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of methods and systems for recommending cloud-computing services to a customer are disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for creating a repository of templates, the method comprising:
    creating, by one or more processors, one or more templates for each of one or more applications types based on a benchmark data, wherein each of the one or more templates are deterministic of a configuration of at least one virtual machine;
    storing, by the one or more processors, each of the one or more templates in a hierarchal structure having one or more hierarchal levels based on the configuration of the at least one virtual machine determinable from the each of the one or more templates, each of the one or more hierarchal levels being indicative of a parameter of the configuration of the at least one virtual machine, wherein the parameter of the configuration of the at least one virtual machine corresponds to at least one of a CPU, a memory, a storage, a load handling capability of the at least one virtual machine, or a software installed on the at least one virtual machine; and
    defining, by the one or more processors, one or more rules to traverse through the one or more hierarchal levels to access the one or more templates.

2. The method of claim 1, wherein the benchmark data corresponds to at least one of a number of virtual machines of a defined configuration required to execute an application of a particular application type, a performance measure of a virtual machine with the defined configuration while executing the application of the particular application type, a cost of the virtual machine with the defined configuration, a measure of throughput, a number of nodes required by the virtual machine with the defined configuration to execute the application.

3. The method of claim 2, wherein the performance measure of the virtual machine comprises a first performance measure of the virtual machine in a distributed computing environment and a second performance measure of the virtual machine in a clustered computing environment.

4. The method of claim 1, wherein the parameter of the configuration associated with the at least one virtual machine further comprises a type of the at least one virtual machine, and an application type executable on the at least one virtual machine.

5. The method of claim 4, wherein the type of the at least one virtual machine comprises at least one of a large virtual machine, a medium virtual machine, or a small virtual machine.

6. The method of claim 5, wherein the type of the at least one virtual machine is determined based on the configuration of the at least one virtual machine.

7. A method for creating a template from one or more pre-defined templates stored in a hierarchal structure, the hierarchal structure comprising one or more hierarchal levels, the method comprising:
    receiving, by one or more processors, a request to execute an application, the request comprising one or more requirements parameters;
    traversing, by the one or more processors, the hierarchal structure by selecting at least two paths at each of the one or more hierarchal levels based on one or more rules to traverse the hierarchal structure and the one or more requirements parameters;
    selecting, by the one or more processors, a set of pre-defined templates at one or more leaf nodes of the hierarchal structure based on the at least two paths selected at each of the one or more hierarchal levels; and
    creating, by the one or more processors, the template by combining each template in the selected set of pre-defined templates, wherein the template is deterministic of a configuration of at least one virtual machine.

8. The method of claim 7, wherein each of the one or more hierarchal levels is indicative of a parameter of the configuration of the at least one virtual machine.

9. The method of claim 7, wherein the one or more requirements parameters comprises a type of the application, at least one of a load requirement, budget constraints, a virtual machine type, a memory requirement, or a storage requirement.

10. The method of claim 7 further comprising storing, by the one or more processors, the created template in the hierarchal structure.

11. The method of claim 10 further comprising generating, by the one or more processors, a rule-set to access the created template in the hierarchal structure.

12. The method of claim 7, wherein the created template includes the configuration of each of the at least one virtual machine associated with each template in the set of pre-defined templates.

13. The method of claim 7, wherein the created template is presented to a user, wherein the user has sent the request.

14. The method of claim 13 further comprising receiving, by the one or more processors, a response from the user indicative of whether the user accepts the configuration of one or more virtual machines in the created template.

15. The method of claim 14 further comprising receiving, by the one or more processors, input from the user, based on the response, to at least one of modify the configuration of the one or more virtual machines, or create a new configuration of the one or more virtual machines.

16. The method of claim 7, wherein the at least two paths are selected from one or more paths connecting two adjacent hierarchy levels.

17. The method of claim 7, wherein each template in the selected set of pre-defined templates correspond to a different configuration of a virtual machine.

18. A system for creating a repository of templates, the system comprising:
one or more processors operable to:
create one or more templates for each of one or more applications types based on a benchmark data, wherein each of the one or more templates being deterministic of a configuration of at least one virtual machine;
store each of the one or more templates in a hierarchal structure having one or more hierarchal levels based on the configuration of the at least one virtual machine determinable from the each of the one or more templates, each of the one or more hierarchal levels being indicative of a parameter of the configuration of the at least one virtual machine, wherein the parameter of the configuration of the at least one virtual machine corresponds to at least one of a CPU, a memory, a storage, a load handling capability of the at least one virtual machine, or a software installed on the at least one virtual machine; and
define one or more rules to traverse through the one or more hierarchal levels to access the one or more templates.

19. A system for creating a template from one or more pre-defined templates stored in a hierarchal structure, the hierarchal structure comprising one or more hierarchal levels, the system comprising:
one or more processors operable to:
receive a request to execute an application, the request comprising one or more requirements parameters;
traverse the hierarchal structure by selecting at least two paths at each of the one or more hierarchal levels based on one or more rules to traverse the hierarchal structure and the one or more requirements parameters;
select a set of pre-defined templates at one or more leaf nodes of the hierarchal structure based on the at least two paths selected at each of the one or more hierarchal levels; and
create the template by combining each template in the selected set of pre-defined templates, wherein the template is deterministic of a configuration of at least one virtual machine.

20. The system of claim 18, wherein each of the one or more hierarchal levels is indicative of a parameter of the configuration of the at least one virtual machine.

21. The system of claim 18, wherein the one or more processors are further operable to store the created template in the hierarchal structure.

22. The system of claim 20, wherein the one or more processors are further operable to generate a rule-set to access the created template in the hierarchal structure.

23. The system of claim 18, wherein the created template includes the configuration of each of the at least one virtual machine associated with each template in the set of pre-defined templates.

24. A computer program product for use with a computing device, the computer program product comprising a non-transitory computer readable medium, the non-transitory computer readable medium stores a computer program code for creating a repository of templates, the computer program code is executable by one or more processors in the computing device to:
create one or more templates for each of one or more applications types based on a benchmark data, wherein each of the one or more templates being deterministic of a configuration of at least one virtual machine;
store each of the one or more templates in a hierarchal structure having one or more hierarchal levels based on the configuration of the at least one virtual machine determinable from the each of the one or more templates, each of the one or more hierarchal levels being indicative of a parameter of the configuration of the at least one virtual machine, wherein the parameter of the configuration of the at least one virtual machine corresponds to at least one of a CPU, a memory, a storage, a load handling capability of the at least one virtual machine, or a software installed on the at least one virtual machine; and
define one or more rules to traverse through the one or more hierarchal levels to access the one or more templates.

25. A computer program product for use with a computing device, the computer program product comprising a non-transitory computer readable medium, the non-transitory computer readable medium stores a computer program code for creating a template from one or more pre-defined templates stored in a hierarchal structure, the hierarchal structure comprising one or more hierarchal levels, the computer program code is executable by one or more processors in the computing device to:
receive a request to execute an application, the request comprising one or more requirements parameters;
traverse the hierarchal structure by selecting at least two paths at each of the one or more hierarchal levels based on one or more rules to traverse the hierarchal structure and the one or more requirements parameters;
select a set of pre-defined templates at one or more leaf nodes of the hierarchal structure based on the at least two paths selected at each of the one or more hierarchal levels; and
create the template by combining each template in the selected set of pre-defined templates, wherein the template is deterministic of a configuration of at least one virtual machine.

* * * * *